United States Patent [19]

Töpker et al.

[11] Patent Number: 5,527,082
[45] Date of Patent: Jun. 18, 1996

[54] TUBULAR REINFORCEMENT MEMBER

[75] Inventors: Dieter Töpker, Paderborn; Werner Böhmer, Willebadessen, both of Germany

[73] Assignee: Benteler AG, Paderborn, Germany

[21] Appl. No.: 284,562

[22] PCT Filed: Dec. 7, 1993

[86] PCT No.: PCT/DE93/01170

§ 371 Date: Aug. 5, 1994

§ 102(e) Date: Aug. 5, 1994

[87] PCT Pub. No.: WO94/13503

PCT Pub. Date: Jun. 23, 1994

[30] Foreign Application Priority Data

Dec. 8, 1992 [DE] Germany .......................... 42 41 196.3

[51] Int. Cl.⁶ .................................................... B60J 5/00
[52] U.S. Cl. ........................................ 296/146.6; 296/188
[58] Field of Search ................................ 296/146.6, 188

[56] References Cited

U.S. PATENT DOCUMENTS

| | | | |
|---|---|---|---|
| 4,948,196 | 8/1990 | Baba et al. | 296/188 |
| 5,255,487 | 10/1993 | Wieting et al. | 296/188 X |
| 5,277,469 | 1/1994 | Klippel | 296/146.6 |

FOREIGN PATENT DOCUMENTS

| | | | |
|---|---|---|---|
| 0235091 | 9/1987 | European Pat. Off. | |
| 0330759 | 9/1989 | European Pat. Off. | 296/188 |
| 4032992 | 5/1991 | Germany . | |
| 47615 | 2/1989 | Japan | 296/188 |
| 208225 | 8/1989 | Japan | 296/146.6 |
| 4024118 | 1/1992 | Japan | 296/188 |
| 4092719 | 3/1992 | Japan | 296/146.6 |
| 4095526 | 3/1992 | Japan | 296/146.6 |
| 4183635 | 6/1992 | Japan | 296/188 |
| 4048176 | 2/1994 | Japan | 296/188 |

*Primary Examiner*—Dennis H. Pedder
*Attorney, Agent, or Firm*—Friedrich Kueffner

[57] ABSTRACT

The tubular reinforcement member (2) has a circular cross section. Compared to the end portions serving for fastening the reinforcement member to the inner side of the door, the middle portion (1) in longitudinal direction of the reinforcement member has a greater resistance against bending loads. For this purpose, at least one sheet steel strip (4) extending parallel to the longitudinal axis (3) of the reinforcement member is tangentially fastened to the periphery of the middle portion (1) in a plane extending parallel to the impact direction (5). The width (B) of the sheet steel strip (4) is overall smaller than the thickness (D) of the reinforcement member. The width (B) decreases in accordance with the bending moment pattern toward the ends of the sheet steel strip (4). The decrease in width may be linear or parabolical.

1 Claim, 2 Drawing Sheets

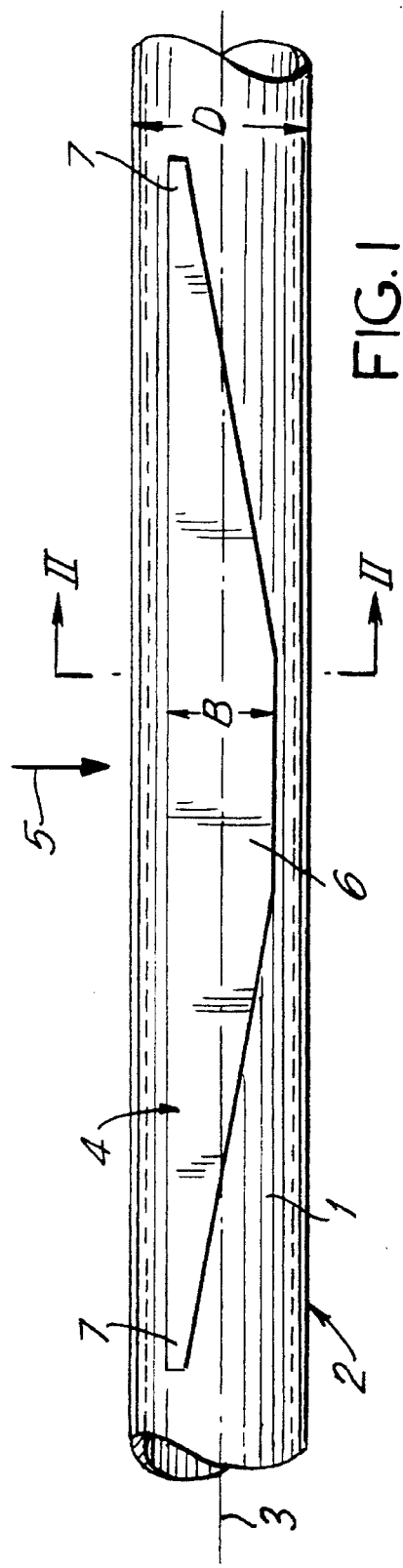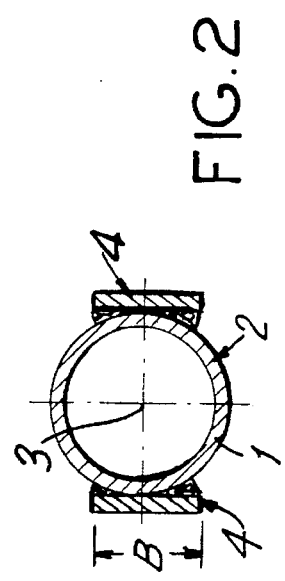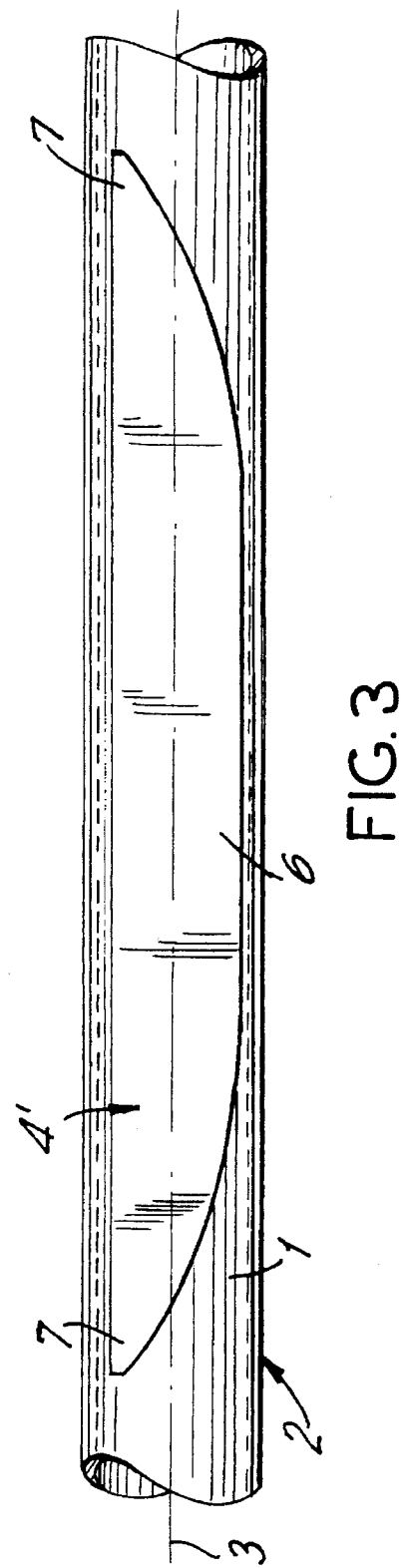

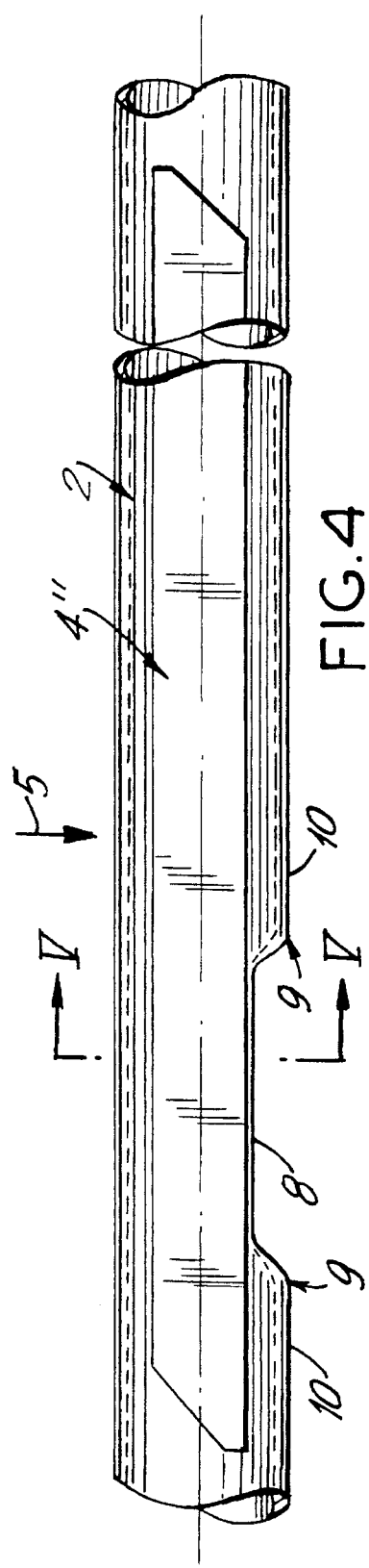
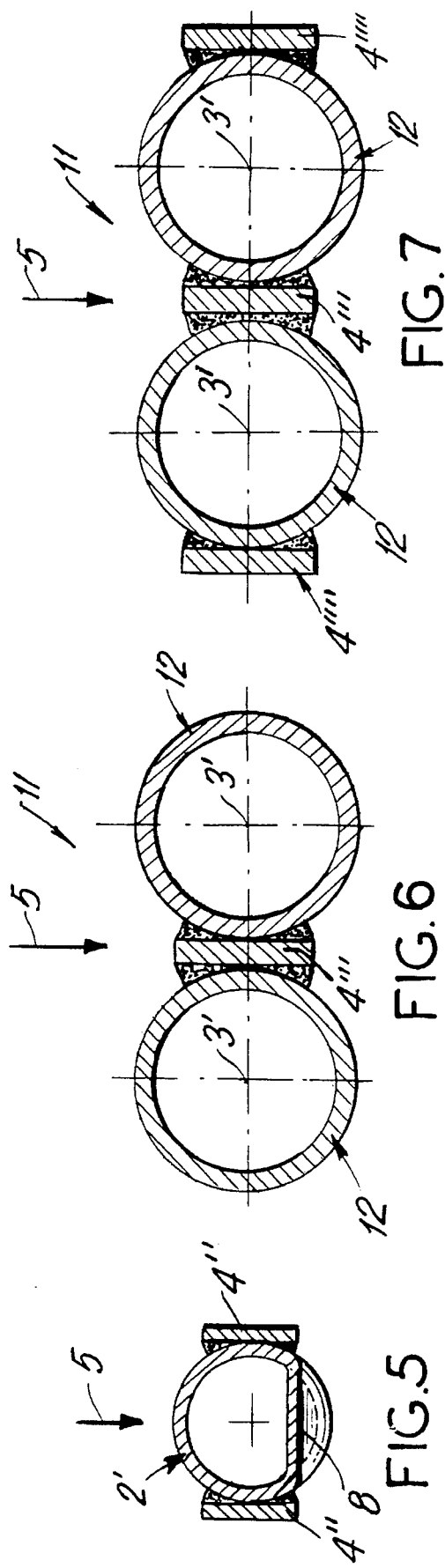

TUBULAR REINFORCEMENT MEMBER

BACKGROUND OF THE INVENTION

1. Field of the Invention

The invention relates to a tubular reinforcement member for a motor vehicle door.

2. Description of the Related Art

A reinforcement member of this type is known as disclosed in DE 40 32 992 A1. The reinforcement member serves as a stiffening particularly of the door of a passenger car and is intended to absorb the impact energy in the case of an impact from the side and to convert the impact energy into mechanical work. The desired result is an increased safety of the passengers of passenger cars, independently of whether another car impacts from the side or whether, for example, a passenger car whose driver has lost control impacts against a post or a mast.

In view of the fact that in the case of an impact the middle portion of the reinforcement member provides the greatest contribution to the magnitude of the capability of work absorption, it is suggested in the known case, by taking into consideration the known mathematical relationships between elastic line and section modulus, to provide the middle portion in longitudinal direction of the reinforcement member with a resistance against bending loads which is greater than that of the end portions serving for fastening the reinforcement member to the inner side of the door. For this purpose, the middle portion has not only been deformed into an elliptic or oval shape, but has additionally been provided with a metal sleeve which is slid into or onto the reinforcement member prior to the deformation of the middle portion. The sleeve is fixed into its position by gluing, welding or soldering. As an alternative to the sleeve which is closed at its circumference, additionally the use of a slotted sleeve has been suggested, wherein the sleeve is selected in its dimensions in such a way that a clamping effect occurs. Moreover, in accordance with a third alternative, the wall thickness in the middle portion is selected greater than in the adjacent portions or the inner space of the middle portion was filled with a medium, for example, a metal foam or wood, which has a lower specific gravity.

However, all of these measures for reinforcing the middle portion of a reinforcement member have in common that the manufacture is technically difficult and fixing it in its position is complicated. A very expensive individual manufacture of each reinforcement member is generally unavoidable.

SUMMARY OF THE INVENTION

It is the object of the present invention to further develop a tubular reinforcement member in such a way that it can be easily manufactured and easily mounted even in different types of door models.

In accordance with the invention, at least one sheet steel strip extending parallel to the longitudinal axis of the reinforcement member is tangentially fastened to the middle portion of the reinforcement member in a plane extending parallel to the impact direction.

As a result, a stiffening with optimum weight has now been provided for closed tube sections, particularly with circular cross section, but also with oval or elliptically-shaped cross section, which specifically permits a lightweight construction with a low structural depth of a vehicle door in transverse direction, i.e., the possible direction of load application in the case of an impact. It is now possible to use extremely thin-walled reinforcement members in which it is ensured that the end portions serving for fastening the reinforcement member to the inner side of the door can transmit the bending load to be expected, while the middle portion is stiffened to such an extent that the maximum bending load to be expected is converted without premature buckling into deformation work. In this connection, the invention makes it possible within a wide range to adapt the length and/or the height and/or the thickness of at least one sheet steel strip, preferably however of two diametrically oppositely located parallel sheet steel strips, exactly to the bending load of the reinforcement member which is specific to the door.

However, the invention not only makes it possible to provide a reinforcement with optimum weight in a tubular reinforcement member. Rather, the invention makes it also possible that, in the case of so-called double tube reinforcement members, the middle portions which are subjected to bending load can be stiffened. This can be effected, for example, by providing a single sheet steel strip between the two tubes. However, it is also possible to provide altogether three sheet steel strips parallel to each other in the middle between the double tubes and on the outsides of the double tubes. The configuration of the individual sheet steel strips depends on the intended load bearing capability. Certainly, it is possible to provide a large number of different load bearing capabilities which can be combined from the respective sheet steel strip contours.

Finally, the invention makes it possible to provide a reinforcement composed of a sheet steel strip at those locations where, for example, because of partial structural limitations in the door of a motor vehicle, a reinforcement member whose cross section is, for example, circular, has been provided with indentations which usually significantly weaken the actual cross section of the reinforcement member. It is now possible also in such a case to provide a necessary stiffening in the area of the indentation by appropriate adaptation of a sheet steel strip or several sheet steel strips.

Moreover, a disadvantage is compensated which occurs when the indentation is effected by hot deformation. In that case, inevitably a temperature transition zone is produced between the heated portion, for example, the portion heated to a temperature above 800° C., and the adjacent portions which have not been heated, wherein all temperature stages between room temperature and annealing temperature occur in the temperature transition zone in the material of the reinforcement member. This causes e.g., a steel which has been tempered to high strength to lose its high strength properties; however, these high strength properties are the prerequisite for the effectiveness of a reinforcement member in order to be able to produce sufficiently high deformation work in the case of a side crash. This temperature transition zone can now be covered by means of the invention by a specific positioning of at least one sheet steel strip, so that the weakening of the reinforcement member caused by the partial heating is compensated.

In order to further take into consideration the advantage of the small structural depth in load direction, the width of the sheet steel strip may be smaller than the thickness of the reinforcement member.

A particularly advantageous further development of the basic concept of the invention is seen in a decrease in the width of the sheet steel strip toward its ends. In this manner, a jump in stiffness over the length of the reinforcement member is avoided which could possibly lead to premature buckling. Depending on the size of the door and the safety requirements, the width can decrease parabolically or linearly from the middle of the sheet steel strip toward the ends.

Although the sheet steel strip can be fastened to the reinforcement member in different ways, welding should be particularly advantageous since it is simple with respect to manufacturing technology.

In addition to the above-mentioned measures for providing a greater bending resistance in the middle portion of a reinforcement member, the mechanical-technological property can be adjusted as another additional parameter in order to reduce the weight of the reinforcement member while improving the deformation of the impact energy into deformation work.

BRIEF DESCRIPTION OF THE DRAWING

The invention is explained in more detail in the following with the aid of embodiments illustrated in the drawing. In the drawing:

FIG. 1 is a top view of a middle portion of a tubular reinforcement member for a motor vehicle door;

FIG. 2 is a vertical sectional view of the illustration of FIG. 1 taken along line II—II and rotated by 90°;

FIG. 3 is a top view of the middle portion of a second embodiment of a tubular reinforcement member for a motor vehicle door;

FIG. 4 is a top view of the middle portion of a third embodiment of a tubular reinforcement member for a motor vehicle door;

FIG. 5 is a vertical sectional view of the illustration of FIG. 4 taken along line V—V and rotated by 90°;

FIG. 6 is a vertical cross section through a double tube reinforcement member; and FIG. 7 is a vertical cross sectional view through a second embodiment of a double tube reinforcement member.

DETAILED DESCRIPTION OF THE PREFERRED EMBODIMENTS

In FIG. 1, the middle portion of a tubular reinforcement member 2 for a motor vehicle door, not illustrated in detail, is denoted by 1. As can also be seen in FIG. 2 in this connection, the cross section of the reinforcement member 2 is circular with respect to the outer contour as well as with respect to the inner contour.

The end portions of the reinforcement member 2 are not illustrated in detail and serve to fasten the reinforcement member to the inner side of the door.

As can be seen by looking at FIGS. 1 and 2 together, two sheet steel strips 4 extending parallel to the longitudinal axis 3 of the reinforcement member 2 are tangentially welded to the periphery of the reinforcement member 2 in a plane extending parallel to the impact direction 5. The sheet steel strips 4 are arranged in the middle length portion 1, i.e., in the area where the maximum bending load occurs on the reinforcement member 2 in the case of an impact. The width B of the sheet steel strip 4 is configured to decrease from the middle portion 6 toward the ends 7 in accordance with the bending moment pattern. However, the width B is smaller than the thickness D of the reinforcement member 2.

In the case of the embodiment of FIG. 1, the decrease of the width of the sheet steel strips 4 is linear, while a parabolic width reduction of the sheet steel strips 4' is selected in the embodiment of FIG. 3.

The embodiment of a tubular reinforcement member 2' according to FIGS. 4 and 5 has an indentation 8 because of a partial structural limitation in a motor vehicle door. The indentation is located on the side of the reinforcement member facing away from the impact direction. As can be seen, the two sheet steel strips 4" welded to the reinforcement member 2' take into consideration the depth of the indentation 8 by their widths. The ends of their sheet steel strips 4" are slightly bevelled. As a result, the contour of the sheet steel strips 4" is essentially parallelogram-shaped. These sheet steel strips 4" make it possible to reinforce particularly the problem zones 9 between the indentation 8 and the adjacent areas 10.

FIGS. 6 and 7 show double tube reinforcement members 11, 11' in cross section. In the case of the embodiment of FIG. 6, a sheet steel strip 4''' is welded between the two tubes 12.

In the embodiment of FIG. 7, not only a sheet steel strip 4''' is welded between the two tubes 12, additional sheet steel strips 4'''' are welded to the sides of the tubes 12. It is apparent that in the embodiments of FIGS. 6 and 7, the sheet steel strips 4''', 4'''' also extend parallel to the longitudinal axes 3' of the tubes and are tangentially fastened to the peripheries of the tubes 12 in planes which extend parallel to the impact direction 5.

We claim:
1. A reinforcement member for reinforcing a motor vehicle door against an impact in an impact direction, the reinforcement member comprising a tubular member having a longitudinal axis and periphery, the tubular member having a middle portion in the axial direction and end portions adapted to for fastening the reinforcement member to an inner side of the motor vehicle door, the tubular member having curved internal and external peripheries, further comprising two sheet steel strips extending parallel to the axis of the tubular member, wherein the two sheet steel strips are tangentially fastened to the external periphery of the middle portion and extend in a plane extending parallel to the impact direction, wherein the tubular member has at least one indentation in a side of the tubular member facing away from the impact direction.

* * * * *